Figure 1:
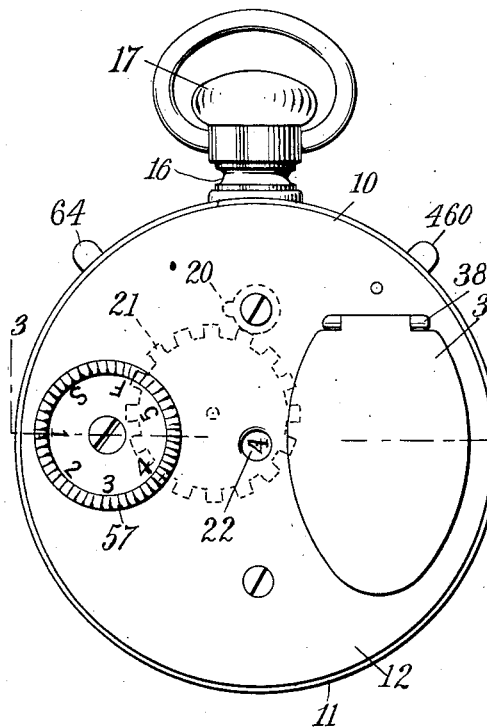

M. NIÉLL.
VEST POCKET CAMERA.
APPLICATION FILED MAY 9, 1907.

904,005.

Patented Nov. 17, 1908.
2 SHEETS—SHEET 1.

Witnesses:
L. Gunford Hanche
G. Blake

Inventor
M. Niéll
By his Attorney
Robert M. Pierson

M. NIÉLL.
VEST POCKET CAMERA.
APPLICATION FILED MAY 9, 1907.
904,005.
Patented Nov. 17, 1908.
2 SHEETS—SHEET 2.
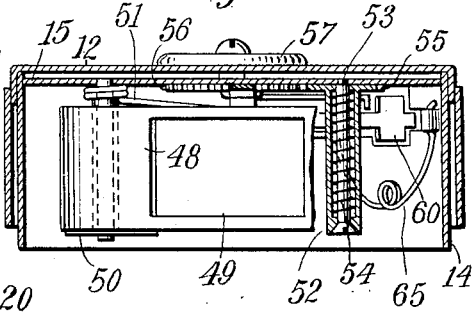
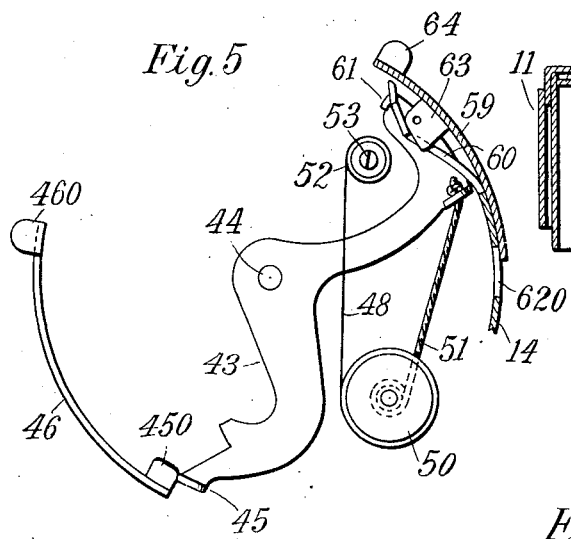
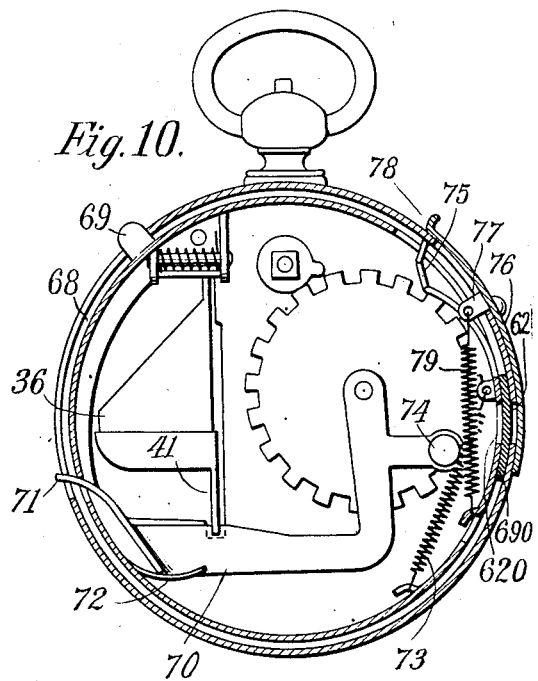
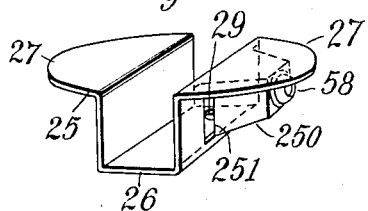
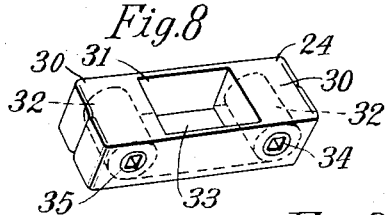
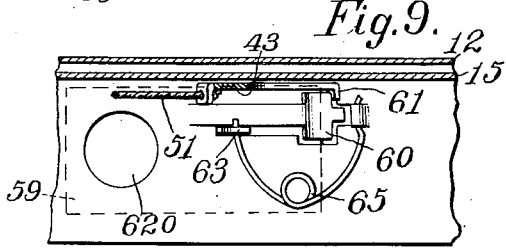
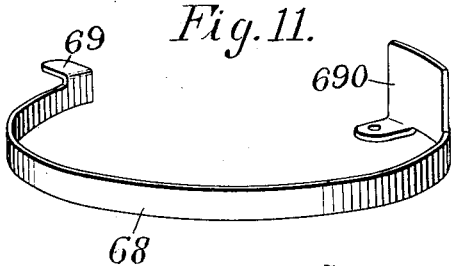
Witnesses:
L. Gosford Handy
J. Blake
Inventor
M. Niéll
By his Attorney
Robert M. Parson

UNITED STATES PATENT OFFICE.

MAGNUS NIÉLL, OF NEW YORK, N. Y.

VEST-POCKET CAMERA.

No. 904,005.  Specification of Letters Patent.  Patented Nov. 17, 1908.

Application filed May 9, 1907. Serial No. 372,692.

*To all whom it may concern:*

Be it known that I, MAGNUS NIÉLL, a subject of the King of Sweden, residing at New York, in the county of New York and State of New York, have invented certain new and useful Improvements in Vest-Pocket Cameras, of which the following is a specification.

This invention relates principally to small photographic cameras conveniently designated as "vest-pocket" cameras and its general object is to increase the number of functions performed by the instrument and improve the manner of their performance without increasing the size of the camera casing, which is preferably made to resemble that of a watch. These cameras as now known ordinarily embody a lens-tube in the usual form and location of the watch-stem, and behind it a peripherally-sliding spring-actuated shutter provided with a setting device and a releasing catch or button, the camera further including an interior removable film-holding frame with take-up and let-off rolls, occupying the whole rear half of the case opposite the lens, and suitable winding and registering devices for operating the film and indicating the number of exposures. Among the defects of such prior cameras are that there is no convenient place within the casing for the location of a finder, which, if embodied, would add greatly to the instrument's usefulness, and also that the provision for taking time exposures is inadequate. Moreover the outward projection of the lens-tube may be considered as a feature to be dispensed with if possible.

In my present improvements I have not only provided for the location of the lens within the casing so as to be better protected, but have also transferred the film-holder to a diametric position and devised a new arrangement of the focal plane with relation to said holder so as to preserve an adequate focal distance. An improved interior removable frame retains the film-holder in place and also carries the lens. In the sector of the casing opposite the lens opening is situated a folding finder adapted to project from the casing when in use, and in connection therewith I have devised certain improved shutter mechanism whereby the setting of the shutter for an exposure releases the finder and permits it to assume its operative position. Associated with the shutter is a novel form of slide which may be retracted to uncover the lens and release the shutter, and this slide may be employed as a time-exposure device when the shutter has been properly neutralized. In the former place of the lens-tube I may locate a knob and spindle connected by suitable mechanism with the wind-up roll of the film and also with the registering device, thus operating like the stem-winding mechanism of a watch.

Figure 2:
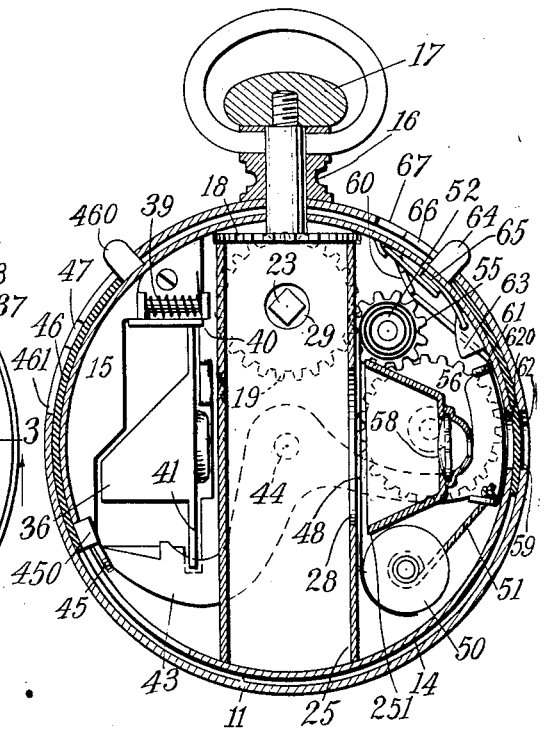
Figure 3:
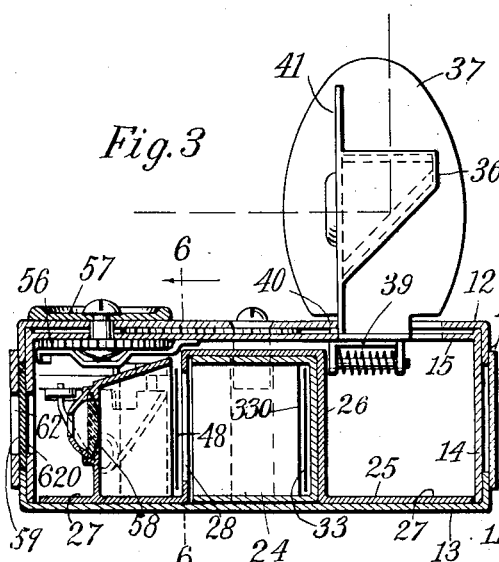
Figure 4:
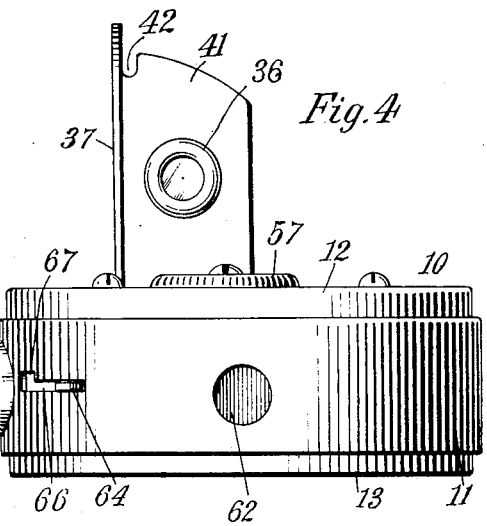

Of the accompanying drawings, Figure 1 represents a top view of a camera embodying my invention. Fig. 2 represents an inverted horizontal section without the roll-holder. Fig. 3 represents a diametric section on the line 3—3 of Fig. 1 with the finder extended. Fig. 4 represents an edge view showing the finder extended. Fig. 5 represents an inverted plan of the shutter setting and releasing parts. Fig. 6 represents a transverse section on the line 6—6 of Fig. 3 without the roll-holder, its frame and the casing cover. Fig. 7 represents a perspective view of the frame for the roll-holder.
Fig. 8 represents a perspective view of the roll-holder. Fig. 9 represents an inner face view of the shutter engaging and releasing parts. Fig. 10 represents an interior view of a modification with the roll-holder and its frame removed. Fig. 11 represents a perspective view of the shutter in this modification.

10 is a circular casing made to resemble a watch case with a peripheral rim portion 11, an integral top plate 12 and a removable cover 13.

14 is an inside ring between which and the rim portion 11 operate the shutter setting and releasing slides 46, 59, and 15 is an inside top plate.

16 is the stem having a winder 17 with a toothed winder-wheel 18 on the inner end of its arbor. This toothed wheel engages a second toothed wheel 19 at right-angles and a trip-dog 20 (Fig. 1) on the arbor of the second wheel engages the teeth of a register-wheel 21 whose numbers show through an opening 22 at the top of the casing. The same arbor has a squared roll-winding post 23 to engage one of the film rolls.

24 is an elongated roll-holder of square section, and 25 is a sheet-metal removable frame, shown in detail in Fig. 7, of general circular form to fill the aperture of the casing, said frame having a diametric trough 26 of the same form as the roll-holder into which said holder is fitted, and two wings 27, 27 to position this plate in the casing and to constitute an inside protective cover. In one side wall of the diametric trough is a rectangular exposure-opening 28 (Figs. 2 and 3) and in the bottom of the trough is a hole 29 to receive the winding-post 23. Frame 25 also carries the lens 58 in the front wall of a truncated chamber 250, the lens being located in line with a pair of openings 62, 620 in the casing rim 11 and inner ring 14, which openings may for convenience be termed the "exposing aperture". The sides of the lens-chamber are slotted at 251 for the passage of the shutter-curtain between lens and film. By mounting the lens on the frame 25 it is maintained at a fixed focal distance from the film in holder 24.

As best shown in Fig. 8 I make the roll-holder 24 with two film-spool compartments 30, 30 at its ends and an exposure-compartment 31 in between, with one side open adjacent the exposure-opening 28.

32, 32 are the film-spools and 33 is the film-strip located adjacent the back wall of the exposure-compartment 31 and therefore distant from the front face of the roll-holder by substantially the width of said holder. It will be understood that the film enters and leaves the compartments 30 through narrow slots shown at 330 in Fig. 3. The take-up spool has a hollow squared winding-arbor 34 to fit over the squared winding-post 23 and the let-off spool has a suitable arbor 35 acting as a journal. The package or box formed by this roll-holder may be made of light card-board, thin wood or other suitable material and is sealed at the edges after the film-element is in place, so as to be light-proof. The end or ends of the sensitive strip may be provided with black extension-strips in a known manner, thus enabling this film package to be loaded into the camera and removed in daylight. To get at the film for development the package may be destroyed.

A suitable finder 36 of ordinary construction is affixed to an oval cover-plate 37 hinged at 38 to the top of the casing so that the finder when not in use may fold into the casing through an opening in the top-side wall thereof and then occupy the rear segment of the casing back of the roll-holder. A spring 39 tends to throw the finder out to an operative position as shown in Figs. 3 and 4 where it stands at right-angles to the camera casing and may be used by looking down on its image-showing surface as the camera is held in a horizontal position. The frame of the finder has a stop 40 to arrest it in this position. The said finder frame also embodies a plate 41 at the front of the finder with a notch 42 in its edge adapted to engage a setting-lever 43 which constitutes a catch to hold the finder in its folded position, the notch having a beveled approach whereby it displaces and becomes automatically engaged with this lever. The setting-lever lies flat against the inner top plate of the casing and is pivoted on a stud 44 in the center of this plate. One end of it has a projection 45 engaged by an inward projection 450 on a segmental setting-slide 46 which reciprocates between the rim of the casing and the parallel inner ring 14, this setting-slide having an outward projection 460 extending through a slot 461 in the casing to be engaged by the operator's finger in setting the shutter. 47 (Fig. 2) is a notch in the lower side of this slot for a time exposure.

The shutter as here shown is in the form of a curtain 48 operating along the front side of the roll-holder trough and formed with an exposure-opening 49 (Fig. 6). One end of this curtain is fastened to a drum 50 having a pulley at its lower end around which is wound a cord 51 attached to the second arm of the setting-lever 43. The opposite end of the curtain is attached to a spool 52 surrounding a fixed post 53 and a helical spring 54 has one end attached to the spool and exerts tension to wind the curtain up on the spool. The other end of the spring is fixed to a gear pinion 55 (Figs. 2 and 6) meshing with a gear 56 on the arbor of an adjusting-plate 57 which is exposed outside of the casing. This plate has characters stamped on it indicating different shutter speeds and may be rotated to adjust the tension of the spring 54.

Across the "exposing aperture" 62, 620 operates a segmental slide 59 normally actuated in a lens-covering direction by a spring 65 (Figs. 2 and 6). 60 is a spring catch stamped out of the inner ring 14 and adapted to engage a projection 61 on the second arm of the setting-lever 43 and to be released from such engagement by the action of a cam projection 63 on the slide 59. An outer projection 64 on this slide extends through a slot 66 in the casing-rim to be engaged by the operator's finger and the bottom of this slot has at one end a notch 67 for holding the slide retracted during a time exposure.

The operation of taking an instantaneous picture includes the setting of the shutter and the release thereof, and in setting the shutter the finder is automatically released and projected into operative position. These events are brought about by the operator engaging the finger-projection 460 and throwing the setting-slide 46 to its extreme position as indicated in Fig. 5. The slide carries with it the setting-lever 43 until the projection 61 thereon is engaged by the spring catch 60 whereby the shutter curtain 48 is wound up on drum 50 against the tension of the spring within spool 52. The first movement of the setting-lever 43 releases the finder 36 whose spring throws it out to the operative position shown in Figs. 3 and 4. If merely the release of the finder is desired it may be performed by moving the setting-slide 46 only a short distance without completely setting the shutter. When the shutter is set for an exposure it may be released by the operator's finger engaging projection 64 on the lens cover-slide 59 and moving said slide until the cam projection 63 throws the spring catch 60 out of engagement with the setting-lever. In Fig. 5, projection 63 is just about to throw the catch. This frees the shutter and allows the curtain 48 to move its exposure-opening quickly across the focal space while the lens opening remains uncovered by slide 59. After that the operator releases the lens cover-slide 59 and spring 65 returns it to its normal position covering the exposing aperture. The return of the shutter returns the setting-lever 43 and the setting slide 46 to their initial positions by the action of the shutter spring 54. The finder 36 may now be folded inwardly and reengaged with the setting-lever.

To make a time exposure the setting-slide 46 is moved until projection 460 enters the notch 47. This moves the opening in the shutter curtain to an exposing position opposite the lens and the exposure may then be made by retracting and releasing the slide 59, its projection 64 being engaged in notch 67, if desired, to hold the slide open for a long exposure. After the time exposure is made, the projection 460 may be released from notch 47 and the shutter allowed to return.

It will be noted that I have combined in one member, namely the slide 59, two functions, namely that of a cover for the lens to prevent an exposure while the opening in the shutter is being moved past the lens during the setting movement of said shutter, and that of a trip or release for liberating the shutter, thus enabling the lens to be uncovered and the shutter released by one operation, but I do not wholly confine myself to this arrangement.

After an exposure the film may be moved to be ready for a new exposure by rotating the winder 17 as previously described.

Figs. 10 and 11 show a modification differing principally in the construction of the shutter and its operating mechanism and in the omission of the stem winder for operating the film strip. In this case the film may be shifted in any approved manner. The film-roll holder and its frame which are removed in this view, may be of the same construction as previously described except that in the roll-holder frame 25 the slots 251 for the passage of the curtain shutter employed in the previous form are preferably omitted.

68 is the shutter-slide of segmental form mounted between the rim and inner ring and having a finger-projection 69 at one end and the shutter 690 at the other end.

70 is a catch-lever for locking and releasing the finder 36, said lever having a projection 71 at the end of the slot in which projection 69 moves, to be engaged at the completion of the shutter-setting movement or engaged independently by the operator's finger.

72 is the spring for lever 70.

73 is a shutter-retracting helical spring having one end fixed to the casing and the other end fixed to the shutter while its intermediate portion passes around a guide-post 74 on an arm of the lever 70 so as to exert a tangential pull on the shutter through a substantial range of movement. 75 is the spring shutter-catch adapted to engage the rear edge of shutter 690 and 76 is an outside lens cover-slide having an inner cam projection 77 to release the catch 75, an outer finger-projection 78, and a retracting spring 79.

I claim:

1. A photographic camera having a casing of watch-case form with an exposing aperture in its rim, a substantially diametric film-roll holder within the casing, and a folding finder occupying the rear segment of the casing and adapted to be projected outwardly from the casing into operative position.

2. A photographic camera comprising a casing with substantially parallel sides and a peripheral wall or rim formed with an exposing aperture, a film-roll holder extending substantially across the middle of the casing, and a finder at the rear of said holder hinged to fold within the casing or to stand out therefrom in operative position.

3. A photographic camera comprising a casing having an exposing aperture, shutter mechanism, and a folding finder controlled by said shutter mechanism.

4. A photographic camera comprising a casing, a finder normally folded within the same and yieldingly projected into operative position, an exposing shutter, and shutter-operating means adapted to automatically release said finder from its folded position.

5. A photographic camera comprising a casing, a finder hinged thereto, a spring to project said finder into operative position, an exposing shutter, and means controlled by the setting of said shutter for automatically releasing the finder.

6. A photographic camera comprising a casing, an exposing shutter, shutter-setting and releasing devices, and a folding finder adapted to be automatically projected into operative position by the operation of setting the shutter.

7. A photographic camera comprising a casing of watch-case form having a rim and side walls, a folding finder operating through an opening in one of said side walls, and shutter mechanism including a segmental shutter-setting slide mounted on said rim and adapted to automatically cause the projection of said finder into operative position.

8. A photographic camera comprising a casing, a folding finder adapted to be automatically projected into operative position, and shutter mechanism including a shutter-setting device adapted to cause such projection of the finder, said finder being also capable of projection at will without setting the shutter.

9. A photographic camera comprising a substantially circular casing having a cover to open and close it, a removable roll-holder frame having a substantially diametric trough, a self-contained roll-holder removably mounted in said trough, and devices accessible from the outside of the casing for operating said roll-holder.

10. A photographic camera comprising a casing of watch-case form, a film-roll holder diametrically mounted therein, devices accessible from the outside of said casing for operating the film, a removable frame having a receptacle for said holder and portions constituting an inner protective cover, and an outer removable cover forming part of the casing.

11. A camera comprising a casing having shutter mechanism and film-operating mechanism, an inner removable frame provided with a lens, and a film-holder removably mounted in said frame and having means for connecting with the film-operating mechanism.

12. A photographic camera comprising a casing of watch-case form having an exposing aperture in its rim, a curtain shutter in said casing having a retracting spring and a cord and pulley for setting the shutter, a setting-lever within the casing having one arm attached to said cord, catch mechanism to engage said arm, and a segmental setting-slide mounted on the rim of the casing and engaging another arm of the lever.

13. A photographic camera comprising a casing of watch-case form having opposite side walls and having a rim formed with an exposing aperture, a lens, a curtain shutter in said casing operating back of the lens and rolled at both ends, a spool at one rolled end of said shutter, a retracting spring within said spool, and mechanism mounted on one of said side walls and accessible from the outside thereof for varying the retractive tension of said spring.

14. A photographic camera comprising a casing of watch-case form having opposite side walls and having a rim formed with an exposing aperture, shutter mechanism, a progressively-moving sensitive device within the casing adapted to receive a succession of exposures, a stem projecting outwardly from said rim and having a winder, and mechanism connecting said winder with the sensitive device for operating the latter.

In testimony whereof I have hereunto set my hand in the presence of two subscribing witnesses, the eighth day of May, 1907.

MAGNUS NIÉLL.

Witnesses:
G. W. HOPKINS,
R. M. PIERSON.